United States Patent
Chen et al.

(10) Patent No.: US 9,897,837 B2
(45) Date of Patent: Feb. 20, 2018

(54) MOBILE TERMINAL

(71) Applicant: Wuhan China Star Optoelectronics Technology Co., Ltd., Wuhan, Hubei (CN)

(72) Inventors: Shih-hsiang Chen, Guangdong (CN); Pengbo Xu, Guangdong (CN)

(73) Assignee: Wuhan China Star Optoelectronics Technology Co., Ltd., Wuhan, Hubei (CN)

( * ) Notice: Subject to any disclaimer, the term of this patent is extended or adjusted under 35 U.S.C. 154(b) by 185 days.

(21) Appl. No.: 14/903,367

(22) PCT Filed: Dec. 25, 2015

(86) PCT No.: PCT/CN2015/098968
§ 371 (c)(1),
(2) Date: Jan. 7, 2016

(87) PCT Pub. No.: WO2017/067063
PCT Pub. Date: Apr. 27, 2017

(65) Prior Publication Data
US 2017/0235183 A1    Aug. 17, 2017

(30) Foreign Application Priority Data

Oct. 19, 2015 (CN) .......................... 2015 1 0680066

(51) Int. Cl.
*G02F 1/1333* (2006.01)
*G06F 1/16* (2006.01)
(Continued)

(52) U.S. Cl.
CPC ...... *G02F 1/133308* (2013.01); *G06F 1/1613* (2013.01); *H04M 1/0262* (2013.01);
(Continued)

(58) Field of Classification Search
CPC ............ G02F 1/133308; G06F 1/1613; H04M 1/0262; H04M 1/0266; H04M 1/0277;
(Continued)

(56) References Cited

U.S. PATENT DOCUMENTS 8,947,865 B2    2/2015  Matsuda et al.
2013/0027892 A1  1/2013  Kang et al.
(Continued)

FOREIGN PATENT DOCUMENTS

CN    1017618360 A    6/2010
CN    202049303 U     11/2011
(Continued)

*Primary Examiner* — Mary Ellen Bowman
(74) *Attorney, Agent, or Firm* — Andrew C. Cheng

(57) ABSTRACT

A mobile terminal includes a middle frame, a plastic frame, a backplane, and a display module including a display panel and a backlight module. The plastic frame includes a first frame and a second frame. Two opposite sides of the backlight module respectively abut the first frame and the second frame such that the backlight module is received in the plastic frame. The backplane carries the backlight module and plastic frame. The middle frame surrounds the plastic frame and the display module. The middle frame, the plastic frame and the backplane are formed integrally as a case. The present mobile terminal omit the plastic frame and the backplane to realize slim effect, narrow frame and frameless for the mobile terminal. Besides, an assembly for the display module, the plastic frame and the backplane are omitted to simplify the assembly process and reduce the production cost.

3 Claims, 2 Drawing Sheets

(51) Int. Cl.
*H04M 1/02* (2006.01)
*F21V 8/00* (2006.01)

(52) U.S. Cl.
CPC ....... *H04M 1/0266* (2013.01); *H04M 1/0277* (2013.01); *G02B 6/0051* (2013.01); *G02B 6/0053* (2013.01); *G02B 6/0055* (2013.01); *G02B 6/0088* (2013.01); *H04M 2201/38* (2013.01)

(58) Field of Classification Search
CPC ............. H04M 2201/38; G02B 6/0051; G02B 6/0053; G02B 6/0055; G02B 6/0088
See application file for complete search history.

(56) References Cited

U.S. PATENT DOCUMENTS

| | | |
|---|---|---|
| 2017/0075160 A1 | 3/2017 | Yang |
| 2017/0235183 A1 | 8/2017 | Chen et al. |

FOREIGN PATENT DOCUMENTS

| | | |
|---|---|---|
| CN | 102664974 A | 9/2012 |
| CN | 103116229 A | 5/2013 |
| CN | 203519971 U | 4/2014 |
| CN | 203590266 U | 5/2014 |
| JP | 5477103 B2 | 4/2014 |

MOBILE TERMINAL

BACKGROUND OF THE INVENTION

1. Field of the Invention

The present invention relates to the electric technology field, and more particularly to a mobile terminal.

2. Description of Related Art

With the progress of science and technology, the mobile terminal gradually tends to intelligence and is applied widely. A user gradually increases the requirements for the performance of the mobile terminal. A large screen, a lightweight, a high-definition have become an inevitable trend in the development of the mobile terminal. With the increase of the display panel of the mobile terminal in the market, increasing the screen occupation ratio and narrowing the frame even to be frameless have become a common target of major manufacturers.

In the conventional art, a usually method to increase the screen occupation ratio is to cancel retaining walls around the backlight in the display module, and only keep the plastic frame and the backplane. In order to place the display module in a case, firstly, assembling the display module, the plastic frame and the backplane together; then, the assembled display module and the case are installed together. The above method increases a thickness formed by the plastic frame and the backplane for the display module such that an entire thickness assembled by the above parts is thicker, and the space that can be reduced is limited, and a process complexity is increased. Besides, in the operation process, the risk of breaking the display module is larger so that the narrow frame technology or the frameless technology cannot be greatly improved.

SUMMARY OF THE INVENTION

The purpose of the present invention is to provide a mobile terminal to solve the problem of thicker plastic frame and backplane, cannot realize lightweight, a narrow frame or a frameless design.

In order to solve above technology problem, a technology solution adopted by the present invention is to provide a mobile terminal, comprising: a middle frame; a plastic frame; a backplane; and a display module including a display panel and a backlight module; wherein, the plastic frame includes a first frame and a second frame, two opposite sides of the backlight module respectively abut the first frame and the second frame such that the backlight module is received in the plastic frame; wherein, the backplane carry the backlight module and plastic frame; wherein, the middle frame surrounds the plastic frame and the display module; wherein, the middle frame, the plastic frame and the backplane are formed integrally as a case, and the case is formed by a plastic injection molding; and wherein, the case includes a bottom plate and a side wall connected with an edge of the bottom plate, the side wall includes two ladder portions, an upper stage of the two ladder portions carry the display panel, and a lower stage of the two ladder portions carry the backlight module.

Wherein, a surface of the display panel away from the backlight module is aligned with a terminal surface of the side wall of the case.

Wherein, the case is a metal case.

Wherein, the mobile terminal further includes back cover, and the back cover is disposed at a side of the case away from the display module.

Wherein, a side of the case away from the display module is provided with a recess for receiving a battery and a circuit board, the battery and the circuit board are both connected to the display module, and the back cover is a flat plate that seals the recess.

Wherein, a side of the case away from the display module is a flat surface, a side of the back cover is provided with a recess, the side of the back cover that provides the recess is fixed to the side of the case away from the display module, the recess is used for receiving a battery and a circuit board, and the battery and the circuit board are both connected to the display module.

In order to solve the above technology problem, another technology solution adopted by the present invention is to provide a mobile terminal, comprising: a middle frame; a plastic frame; a backplane; and a display module including a display panel and a backlight module; wherein, the plastic frame includes a first frame and a second frame, two opposite sides of the backlight module respectively abut the first frame and the second frame such that the backlight module is received in the plastic frame; wherein, the backplane carry the backlight module and plastic frame; wherein, the middle frame surrounds the plastic frame and the display module; and wherein, the middle frame, the plastic frame and the backplane are formed integrally as a case.

Wherein, a surface of the display panel away from the backlight module is aligned with a terminal surface of the side wall of the case.

Wherein, the case is a metal case.

Wherein, the mobile terminal further includes back cover, and the back cover is disposed at a side of the case away from the display module.

Wherein, a side of the case away from the display module is provided with a recess for receiving a battery and a circuit board, the battery and the circuit board are both connected to the display module, and the back cover is a flat plate that seals the recess.

Wherein, a side of the case away from the display module is a flat surface, a side of the back cover is provided with a recess, the side of the back cover that provides the recess is fixed to the side of the case away from the display module, the recess is used for receiving a battery and a circuit board, and the battery and the circuit board are both connected to the display module.

The beneficial effect, in the present invention, the middle frame, the plastic frame and the backplane are formed integrally as a case. The present mobile terminal omit the plastic frame and the backplane to realize slim effect, narrow frame and frameless for the mobile terminal. Besides, an assembly for the display module, the plastic frame and the backplane are omitted to simplify the assembly process and reduce the production cost.

DETAILED DESCRIPTION OF THE PREFERRED EMBODIMENT

The following content combines figures and embodiments for detail description of the present invention.

Figure 1:
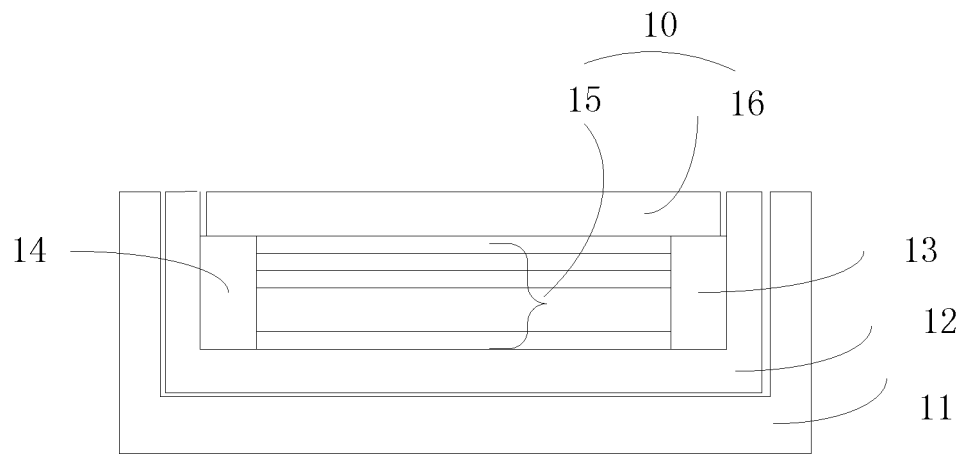
FIG. 1 is a schematic cross-sectional view of a mobile terminal in the conventional art.

As shown in FIG. 1, a mobile terminal includes a middle frame 11, a plastic frame 13/14, a backplane 12, and a display module 10. The display module 10 includes a display panel 16 and a backlight module 15.

A conventional plastic frame is usually formed by four frames. However, in the present invention, the plastic frame in FIG. 1 only includes two opposite first frame 13 and a second frame 14. The first frame 13 and a second frame 14 are not connected and are separated so as to reduce a width of the display module 10 and increase a screen occupation ratio of the mobile terminal.

Two opposite sides of the backlight module 15 respectively abut on the first frame 13 and the second frame 14 such that the backlight module 15 is received in the plastic frame 13/14. Because the plastic frame 13/14 is usually made of a plastic material such that the plastic frame cannot ensure that a large-sized display module 10 will not deform. Therefore, adding a backplane 12 at a bottom portion is required. The backplane 12 supports the backlight module 15 and the plastic frame 13/14. The backplane 12 usually adopts a steel plate. A flat steel plate or a curved steel plate can be selected because of good hardness and deformation resistance ability so as to provide a good support, protect and strengthen structural stiffness.

The display panel 16 is adhered to the backlight module 15 through glue, and then, the assembled display panel 16, the backlight module 15, the plastic frame 13/14 and the backplane 12 are placed into the middle frame 11. The middle 11 surrounds the plastic frame 13/14 and the display module 10 (display panel 16 and the backlight module 15) in order to finish the assembly of the middle frame 11.

In the conventional art, when the plastic frame 13/14, the backplane 12 and the backlight module 15 are in an assembly process, it requires to reserve distances in a length direction and a width direction so as to increase a thickness of the mobile terminal. At the same time, the conventional art requires at least four manufacturing processes in the assembly of the display panel 16, the backlight module 15, the plastic frame 13/14, the backplane 12 and the middle frame 11.

Figure 2:
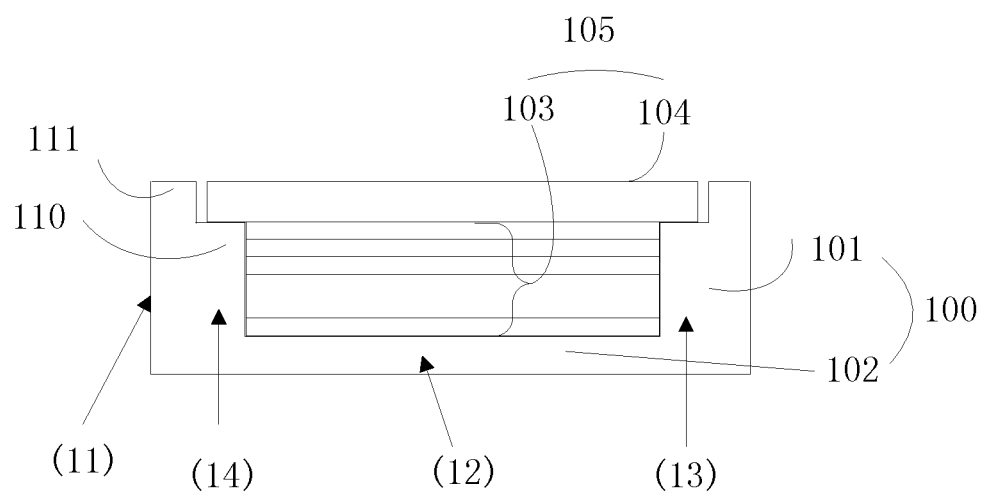
FIG. 2 is a schematic cross-sectional view of a mobile terminal according to a first embodiment of the present invention.

As shown in FIG. 2, an embodiment of the mobile terminal of the present invention includes a case 100, a display module 105 received in the case 100. The case 100 is integrally formed by the middle frame 11, the plastic frame 13/14 and the backplane 12.

The first embodiment of the mobile terminal of the present invention forms the case 100 by one plastic injection molding of the middle frame 11, the plastic frame 13/14 and the backplane 12 in FIG. 1. The case 100 includes a bottom plate 102, a side wall 101 connected with an edge of the bottom plate 102. The side wall 101 at least includes two ladder portions. An upper stage 111 of the ladder portions carries the display panel 104. A lower stage 110 of the ladder portions carries the backlight module 103. A location of the bottom plate 12 of the case 100 is similar to the backplane 12 of the conventional art. A location of the lower stage 110 of the ladder portions of the side wall 101 of the case 100 is similar to the plastic frame 13/14 of the conventional art. An outer structure of the case 100 is similar to the middle frame 11 of the conventional art.

Placing the backlight module 103 in the case 100, and the backlight module 103 abuts on the lower stage of the two ladder portions of the side wall 101 of the case 100. The display panel 104 is attached to the backlight module 103 through glue, and the display panel 104 abuts on the upper stage 111 of the two ladder portions of the side wall 101 of the case 100. A surface of the display panel 104 away from the backlight module 103 is aligned with a terminal surface of the side wall of the case 100. A protection glass 106 can be added to cover the surface of the display panel 104 away from the backlight module 103 in order to further protect the display panel 104 from breaking.

The assembly of the display panel 104, the backlight module 103 and the case 100 finished by the present embodiment can reduce two processes comparing to the conventional art so as to increase the production efficiency and decrease the cost.

Optionally, the case 100 is a metal case.

Figure 3:
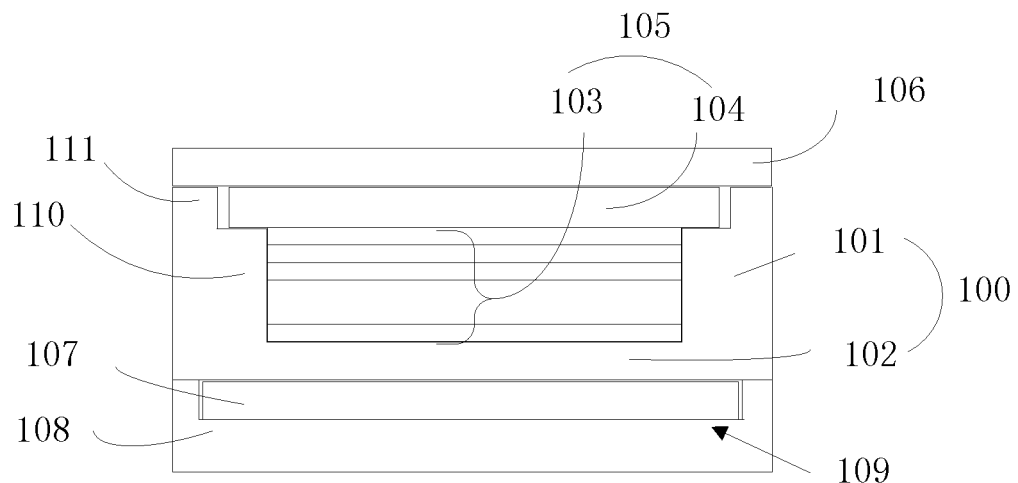
FIG. 3 is a schematic cross-sectional view of a mobile terminal according to a first embodiment of the present invention.

The mobile terminal can further includes a back cover 108, as shown in FIG. 3, the back cover 108 is disposed at a side of the case 100 away from the display module 103. The side of the case 100 away from the display module 105 is a flat surface. A side of the back cover 108 is provided with a recess 109. The side of the back cover 108 that provides with the recess 109 is fixed to the side of the backlight module 105 away from the case 100. The recess 109 is to receive a battery and a circuit board 107. The battery and the circuit board 107 both connect to the display module 105 for providing a power source, a control signal, and a display signal.

Figure 4:
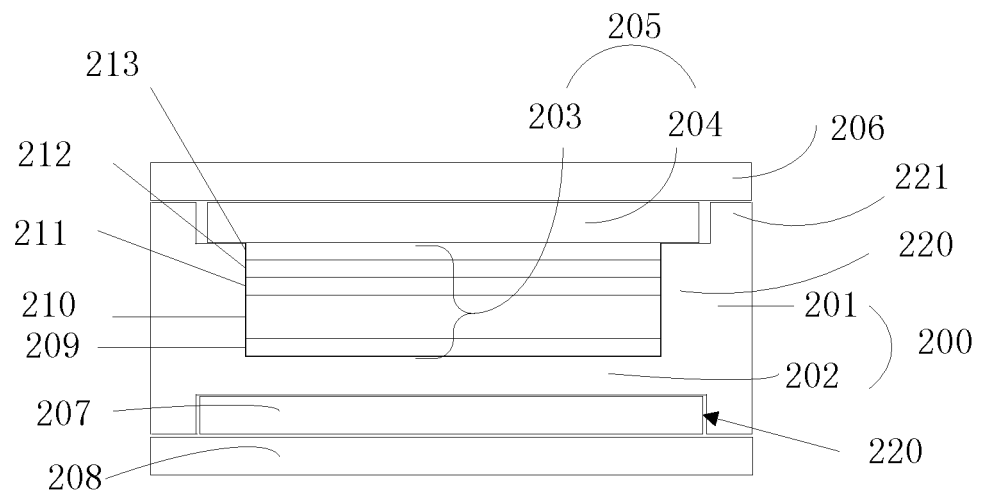
FIG. 4 is a schematic cross-sectional view of a mobile terminal according to a second embodiment of the present invention.

In a second embodiment, the present invention provides a mobile terminal such as a mobile phone. As shown in FIG. 4, the mobile terminal includes a mobile phone case 202 and a display module 205. The display module 205 includes a backlight module 203, a display panel 204, a protection glass 206, a battery and a circuit board 207 and a mobile phone back cover 208.

The mobile phone case 200 includes a bottom plate 202 and a side wall 201 connected with an edge of the bottom plate 202. The side wall 201 includes at least two ladder portions. An upper stage 221 of the two ladder portions carry the display panel 204, and a lower stage 220 of the two ladder portions carry the backlight module 203.

In the present embodiment, the mobile phone case 202 can be a metal case. The display module 205 can be a liquid crystal display module and a display panel 204 can be an LCD. The backlight module 203 includes a reflective sheet 209, a light guide plate 210, a diffusion sheet 211, a prism sheet 212 and composite film 213 stacked sequentially.

Placing the backlight module 203 in the mobile phone case 200, and the backlight module 203 abuts on the lower stage 220 of the two ladder portions of the side wall 201 of the mobile phone case 200. The reflective sheet 209 of the backlight module 203 contacts with the bottom plate 202 of the mobile phone case 200. The display panel 204 is attached to the composite film 213 of the backlight module 203 through glue, and the display panel 204 abuts on the upper stage 221 of the two ladder portions of the side wall 201 of the case 200. A surface of the display panel 204 away from the backlight module 203 is aligned with a terminal surface of the side wall 201 of the case 200. A protection glass 206 can be added to cover the surface of the display panel 204 away from the backlight module 203 in order to further protect the display panel 104 from breaking in order to finish an assembly of the display module 205 and mobile phone case 200.

A side of the mobile phone case 200 away from the display module 205 is provided with a recess 220 for receiving a battery and a circuit board 207. The battery and the circuit board 207 both connect to the display module 205 for providing a power source, a control signal, and a display signal. A mobile phone back cover 208 is a flat plate, and is fixed to the mobile phone case 200 to seal the recess 220 in order to finish the assembly of the entire mobile phone and realize a narrow frame mobile phone.

The present invention describes a mobile terminal in detail through above two embodiments. The mobile terminal of the present invention can omit the plastic frame and the backplane to realize slim effect, narrow frame and frameless for the mobile terminal. Besides, an assembly for the display module, the plastic frame and the backplane are omitted to simplify the assembly process and reduce the production cost.

The above embodiments of the present invention are not used to limit the claims of this invention. Any use of the content in the specification or in the drawings of the present invention which produces equivalent structures or equivalent processes, or directly or indirectly used in other related technical fields is still covered by the claims in the present invention.

What is claimed is:

1. A mobile terminal, comprising:
    a middle frame;
    a plastic frame;
    a backplane; and
    a display module including a display panel and a backlight module;
    wherein the plastic frame includes a first frame and a second frame, two opposite sides of the backlight module respectively abut the first frame and the second frame such that the backlight module is received in the plastic frame;
    wherein the backplane carry the backlight module and plastic frame;
    wherein the middle frame surrounds the plastic frame and the display module;
    wherein the middle frame, the plastic frame and the backplane are formed integrally as a case, and the case is formed by a plastic injection molding; and
    wherein the case includes a bottom plate and a side wall connected with an edge of the bottom plate, the side wall includes two ladder portions, an upper stage of the two ladder portions carry the display panel, and a lower stage of the two ladder portions carry the backlight module;
    wherein a surface of the display panel away from the backlight module is aligned with a terminal surface of the side wall of the case;
    wherein, the case is a metal case;
    wherein the mobile terminal further includes a back cover, and the back cover is disposed at a side of the case away from the display module;
    wherein the display panel is attached to the backlight module through a glue;
    wherein a protection glass is provided to cover the surface of the display panel away from the backlight module in order to protect the display panel from breaking; and
    wherein a recess is formed between the side of the case away from the display module and a side of the back cover for receiving a battery and a circuit board.

2. The mobile terminal according to claim 1, wherein the recess is formed only on the side of the case away from the display module, the battery and the circuit board are both connected to the display module, and the back cover is a flat plate that seals the recess.

3. The mobile terminal according to claim 1, wherein, the recess is only formed on the side of the back cover, the side of the case away from the display module is a flat surface, the side of the back cover that provides the recess is fixed to the side of the case away from the display module, and the battery and the circuit board are both connected to the display module.

* * * * *